(12) United States Patent
D'Silva et al.

(10) Patent No.: US 10,360,802 B2
(45) Date of Patent: Jul. 23, 2019

(54) AID METHOD FOR PILOTING AN AIRCRAFT, ASSOCIATED COMPUTER PROGAM PRODUCT AND AID DEVICE FOR PILOTING

(71) Applicant: Thales, Courbevoie (FR)

(72) Inventors: Cédric D'Silva, Toulouse (FR); Jérôme Sacle, Toulouse (FR); Nicolas Rossi, Toulouse (FR)

(73) Assignee: THALES, Courbevoie (FR)

( * ) Notice: Subject to any disclaimer, the term of this patent is extended or adjusted under 35 U.S.C. 154(b) by 49 days.

(21) Appl. No.: 15/684,155

(22) Filed: Aug. 23, 2017

(65) Prior Publication Data
US 2018/0061248 A1 Mar. 1, 2018

(30) Foreign Application Priority Data

Aug. 26, 2016 (FR) ...................................... 16 01265

(51) Int. Cl.
*G05D 1/10* (2006.01)
*G08G 5/00* (2006.01)

(52) U.S. Cl.
CPC ........... *G08G 5/0039* (2013.01); *G05D 1/101* (2013.01); *G08G 5/0013* (2013.01); *G08G 5/0021* (2013.01); *G08G 5/0047* (2013.01)

(58) Field of Classification Search
CPC ..... G05D 1/101; G05D 1/0808; G08G 5/0039
See application file for complete search history.

(56) References Cited

U.S. PATENT DOCUMENTS

| | | | | |
|---|---|---|---|---|
| 6,163,744 A | * | 12/2000 | Onken | G01C 23/00 340/979 |
| 2012/0191331 A1 | * | 7/2012 | Torres | G08G 5/0013 701/120 |
| 2014/0358415 A1 | * | 12/2014 | McDonald | G05D 1/101 701/120 |
| 2015/0261829 A1 | * | 9/2015 | Whitlow | G06F 17/30539 707/722 |
| 2015/0279218 A1 | * | 10/2015 | Irrgang | G08G 5/0039 701/3 |

(Continued)

FOREIGN PATENT DOCUMENTS

FR 2916842 A1 12/2008

OTHER PUBLICATIONS

French Patent Application No. 16 01265, Rapport de Recherche Preliminaire, dated Apr. 5, 2017, 2 pages.

*Primary Examiner* — Rami Khatib
(74) *Attorney, Agent, or Firm* — Soquel Group LLC (57) ABSTRACT

An aid method for piloting an aircraft including acquiring an instruction intended to alter the flight plan, determining an applicability period of the instruction made up of a plurality of applicability moments of the instruction in which the application of the instruction is compatible with the operational capabilities of the aircraft and with the constraints of the flight plan, for each applicability moment of the instruction, determining an altered flight plan in case of application of the instruction at this applicability moment and calculating values of the operational parameters associated with this flight plan, and selecting an optimal applicability moment based on values of the operational parameters associated with the altered flight plan and operational parameters associated with the current flight plan.

12 Claims, 3 Drawing Sheets

(56) References Cited

U.S. PATENT DOCUMENTS

2015/0364045 A1* 12/2015 Lissajoux ............ G08G 5/0021
701/3
2015/0379875 A1* 12/2015 Sharma ................ G08G 5/0039
701/408

* cited by examiner

AID METHOD FOR PILOTING AN AIRCRAFT, ASSOCIATED COMPUTER PROGAM PRODUCT AND AID DEVICE FOR PILOTING

CROSS REFERENCE TO RELATED APPLICATIONS

This application claims priority under 35 USC § 119 of French Patent Application No. 16 01265 filed on Aug. 26, 2016.

FIELD OF THE INVENTION

The present invention relates to an aid method for piloting an aircraft, and to a computer program product and an aid device for piloting associated with such a method.

BACKGROUND OF THE INVENTION

In a manner known in itself, each flight of an aircraft is done according to a flight plan in particular including a plurality of planned positions of the aircraft during this flight. These positions in particular correspond to predetermined waypoints. Each position represents multiple piloting parameters, for example two-dimensional geographical parameters in various planes of reference, geographical or altimetric parameters relative to the height or altitude of the aircraft, time parameters or speed parameters in various planes of reference.

"Aircraft" refers to a moving vehicle piloted by at least one pilot, and in particular able to fly in the Earth's atmosphere, such as an airplane, helicopter or drone. The pilot uses piloting commands to pilot the aircraft from a cockpit of the aircraft or remotely, from any other appropriate piloting center.

The flight plan is determined before the aircraft's departure and is generally filed with the appropriate authorities.

The flight plan may also undergo changes during the flight. These changes are, for example, caused by changes in weather conditions, air traffic changes or any other type of environmental changes, and are sent to the pilot in the form of instructions from the ground.

The instructions issued by an air traffic controller are said to be of the ATC (Air Traffic Control) type.

The air traffic controller sends the pilot the ATC instructions either through a voice connection implemented by radio communication means, or through a data connection making it possible to send messages retrievable in text form.

The latter type of connection is also referred to as a datalink.

Upon receiving such an instruction, the pilot must in particular verify the compatibility of the instruction with the operating capabilities of the aircraft and any restrictions imposed by the current flight plan of the aircraft.

Thus for example, these restrictions relate to the passage altitude at least at certain waypoints or the passage speed at these waypoints.

Regarding the operational capabilities, the pilot must in particular ensure that the aircraft is able to carry out a corresponding piloting command to comply with the transmitted instruction. These capabilities for example depend on the current weight of the aircraft, its maximum flight altitude, the available fuel, etc.

The pilot determines the consequences that applying this instruction may have on the current flight plan. These consequences generally relate to parameters associated with the flight plan, such as the flight time to a given waypoint, the quantity of fuel available at such a point, etc.

If the instruction is compatible, the pilot confirms to the air traffic controller that the instruction is taken into account and changes the current flight plan based on this instruction.

One can then see that these operations require interpretation, calculations and both manual and mental actions by the pilot. These actions are also a considerable source of errors.

To offset these drawbacks, in the state of the art, systems already exist for processing at least some instructions sent by air traffic control. Thus, for example, these systems can be associated with a computer of the FMS (Flight Management System) type, which incorporates the instructions received in the current flight plan into the aid provided to the pilot.

However, these systems are not completely satisfactory. In particular, they do not make it possible to exempt the pilot from any manual and/or mental activity necessary to apply the transmitted instructions.

SUMMARY OF THE DESCRIPTION

The present invention aims to propose an aid method for the piloting of an aircraft making it possible to greatly simplify the manual and/or mental activities required by the pilot upon receiving an instruction intended to alter the current flight plan of the aircraft.

To that end, the invention relates to an aid method for the piloting of an aircraft, the aircraft including a set of systems implementing operational capabilities of the aircraft, the aircraft performing a flight according to a flight plan, the flight plan including a plurality of waypoints of the aircraft and a plurality of constraints at least at some of these waypoints, the flight plan being associated with a plurality of operational parameters relative to the flight and/or the aircraft and assuming different values at various waypoints of the flight plan; the method including:

acquiring an instruction from a system outside the aircraft and intended to alter the current flight plan of the aircraft;

determining an applicability period of the instruction made up of a plurality of applicability moments of the instruction in which the application of the instruction is compatible with the operational capabilities of the aircraft and with the constraints of the current flight plan of the aircraft, each applicability moment being defined relative to a moment in time of the flight or relative to a geographical position of the aircraft;

for each applicability moment of the instruction, determining an altered flight plan in case of application of the instruction at this applicability moment and calculating values of the operational parameters associated with this altered flight plan;

selecting an optimal applicability moment from among the set of applicability moments based on values of the operational parameters associated with the altered flight plan corresponding to this applicability moment and operational parameters associated with the current flight plan.

According to other advantageous aspects of the invention, the method includes one or more of the following features, considered alone or according to all technically possible combinations:

replacing the current flight plan with the altered flight plan corresponding to the optimal applicability moment of the instruction;

notifying the applicability period of the instruction and the optimal applicability moment;

a piloting command making it possible to apply the instruction in the optimal applicability moment and the notification of the developed piloting command;

incompatibility notification when no applicability moment of the instruction has been determined during the operation for determining a plurality of applicability moments;

each operational parameter corresponds to one of the elements chosen from the group including a remaining flight time, a quantity of fuel available in the aircraft, an altitude of the aircraft, a speed of the aircraft, and a weight of the aircraft;

the selecting an optimal applicability moment includes calculating deviations between values of the operational parameters associated with each altered flight plan and values of the operational parameters associated with the current flight plan;

notifying an optimization report, the optimization report including the deviations between values of the operational parameters associated with the altered flight plan corresponding to the optimal applicability moment and values of the operational parameters associated with the current flight plan;

the selecting an optimal applicability moment includes verifying a plurality of optimization criteria;

the optimization criteria are imposed by an airline operating the aircraft;

in case of alteration of the current flight plan or operational parameters associated with this flight plan for reasons other than the application of the instruction, the determining an applicability period, the determining an altered flight plan, and the selecting an optimal applicability moment are carried out again.

The invention also relates to a computer program product including software instructions which, when implemented by computer equipment, carry out a method as defined above.

The invention also relates to an aid device for the piloting of an aircraft, the aircraft including a set of systems implementing operational capabilities of the aircraft, the aircraft performing a flight according to a flight plan, the flight plan including a plurality of waypoints of the aircraft and a plurality of constraints at least at some of these waypoints, the flight plan being associated with a plurality of operational parameters relative to the flight and/or the aircraft and assuming different values at various waypoints of the flight plan; the device being able to:

acquire an instruction from a system outside the aircraft and intended to alter the current flight plan of the aircraft;

determine an applicability period of the instruction made up of a plurality of applicability moments of the instruction in which the application of the instruction is compatible with the operational capabilities of the aircraft and with the constraints of the current flight plan of the aircraft, each applicability moment being defined relative to a moment in time of the flight or relative to a geographical position of the aircraft;

for each applicability moment of the instruction, determine an altered flight plan in case of application of the instruction at this applicability moment and calculate values of the operational parameters associated with this altered flight plan; and select an optimal applicability moment from among the set of applicability moments based on values of the operational parameters associated with the altered flight plan corresponding to this applicability moment and operational parameters associated with the current flight plan.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
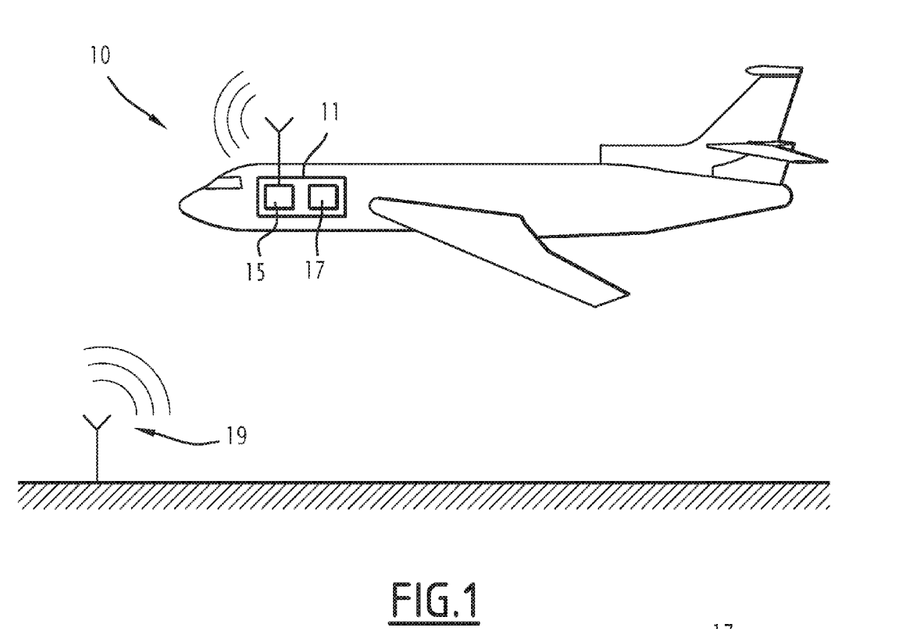
FIG. 1 is a schematic view of an aircraft including a piloting aid device according to the invention.

In the example embodiment of FIG. 1, aircraft 10 is an airplane piloted by at least one pilot. Preferably, this airplane is an airliner operated by an airline.

Alternatively, aircraft 10 is a helicopter, or a drone piloted remotely by a pilot.

Aircraft 10 includes a set of systems 11 allowing it to be piloted.

"System" refers to a device that is at least partially electronic or a combination of such devices, onboard the aircraft 10 and making it possible to pilot this aircraft.

Examples of such systems in particular include a flight management system (FMS), an automatic pilot (AP) system, or a radio management system (RMS) having combinations of different mechanical and electronic devices, or landing gear or any type of slats and flaps having different combinations of mechanical devices.

The operation of each system is characterized by at least one operating datum of this system.

Thus, in the previous example, the operation for example of the slats can be characterized by a plurality of operating data, whereof each operating datum corresponds to a predetermined position of these slats.

The set of systems 11 implements operational capabilities of aircraft 10.

"Operational capability" thus refers to a set of services provided by at least some of the systems of the set of systems 11 and allowing the pilot to perform at least one piloting task of the aircraft 10.

Each operational capability is then determined by the operating data of the system(s) implementing this capability.

In a known manner, each flight of aircraft 10 is done according to a flight plan determined beforehand and filed with the appropriate authorities. A flight plan is also referred to using the abbreviation FPL.

The flight plan includes a plurality of planned waypoints of aircraft 10 through which it must pass during its flight. These waypoints correspond to known geographical positions.

Based on the advancement of the flight, each waypoint is either of the scheduled type or the passed type.

Thus, initially, all of the waypoints of the flight plan are of the scheduled type. As aircraft 10 passes through these points during its flight, these points become of the passed type.

For at least some of the waypoints, the flight plan further includes one or several constraints. These constraints in particular relate to the passage time, the passage speed or the passage altitude at the corresponding waypoint.

The flight plan of aircraft 10 is also associated with a plurality of operational parameters. Each operational parameter pertains to the flight and/or the aircraft.

Each operational parameter for example relates to the flight time, the available fuel, the altitude of the aircraft, its speed or its weight.

In a known manner, combinations of operational parameters exist that achieve operating optimums. The optimizations are known by external systems. Thus for example, these systems are able to determine a combination of parameters X, Y, Z and T, respectively corresponding to the speed of aircraft 10, its altitude, its weight and the outside temperature, under which the operating optimums are achieved.

In a known manner, it is possible to determine the value of each operational parameter at each waypoint of the flight plan or at points comprised between these waypoints.

When it involves a scheduled waypoint, the value of each operational parameter determined at such a point is a predicted value.

When it involves a passed waypoint, the value of each operational parameter determined at such a point is a definitely determined value.

Thus for example, the numerical value of the operational parameter relative to the flight time determined at a scheduled waypoint corresponds to the anticipated passage time of the aircraft by this waypoint.

Similarly, the numerical value of the parameter relative to the fuel, the altitude or the speed determined at this waypoint corresponds to the anticipated fuel available at this point, the altitude or the speed of aircraft 10 at this point, respectively.

In reference to FIG. 1, the set of systems 11 of aircraft 10 in particular includes a communication device 15 and a piloting aid device 17.

Communication device 15 allows the communication of various systems of aircraft 10 with a system outside aircraft 10, for example a ground station 19.

The communication is done using known methods and in particular includes transmitting datalink messages between ground station 19 and aircraft 10. These messages can be retrieved in text form.

In particular, at least some of the messages from ground station 19 and received by communication device 15 include an instruction intended to modify the current flight plan of aircraft 10 during its flight.

Thus for example, such an instruction relates to a change in the altitude of the aircraft at a waypoint of the flight plan, a change in one or several waypoints, a change in passage time, etc.

Of course, all of these changes pertain to scheduled waypoints.

Figure 2:
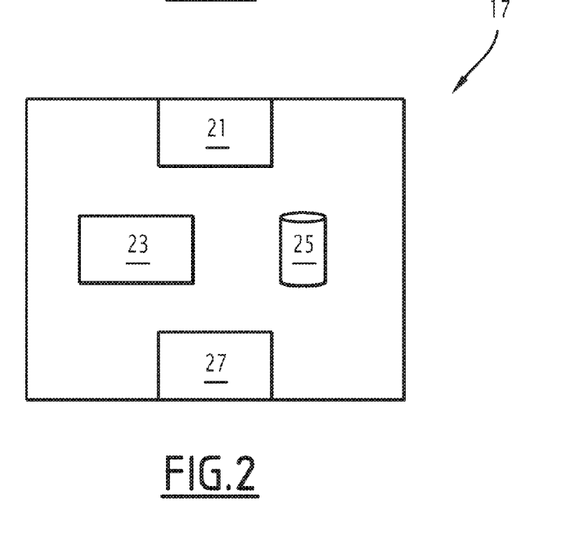
FIG. 2 is a schematic view of the piloting aid device of FIG. 1.

Piloting aid device 17 is illustrated in more detail in FIG. 2.

Thus, in reference to FIG. 2, piloting aid device 17 includes an acquisition module 21, a processing module 23, a database 25 and a display module 27.

Piloting aid device 17, for example, assumes the form of an independent computer further including a memory able to store a plurality of software programs and a processor implementing these programs.

According to another alternative embodiment, piloting aid device 17 is integrated into an existing computer, for example the computer implementing the FMS.

Acquisition module 21 is, for example, a physical module that is in particular connected to communication device 15 and able to acquire any instruction received by this device and intended to alter the flight plan of aircraft 10.

Acquisition module 21 is further able to acquire the current flight plan of aircraft 10 as well as the operating data of the set of systems 11.

Processing module 23 is, for example, a software program able to process the information acquired by acquisition module 21 by implementing at least some of the operations of the piloting aid method according to the invention.

The database is, for example, part of the memory comprising a plurality of optimization criteria. In particular, each optimization criterion has a certain number of rules or preferences that must be respected when the flight plan is altered by an instruction acquired by acquisition module 21.

These criteria are reconfigurable and can for example be determined before each flight.

The optimization criteria are for example determined by the airline operating aircraft 10 and in particular make it possible to optimize the paths of aircraft 10 according to economic and/or safety criteria.

Display module 27 is for example a touch-sensitive display screen allowing the pilot to interact with piloting aid device 17. This module is in particular able to display results of the implementation of the method, as will be explained later.

Figure 3:
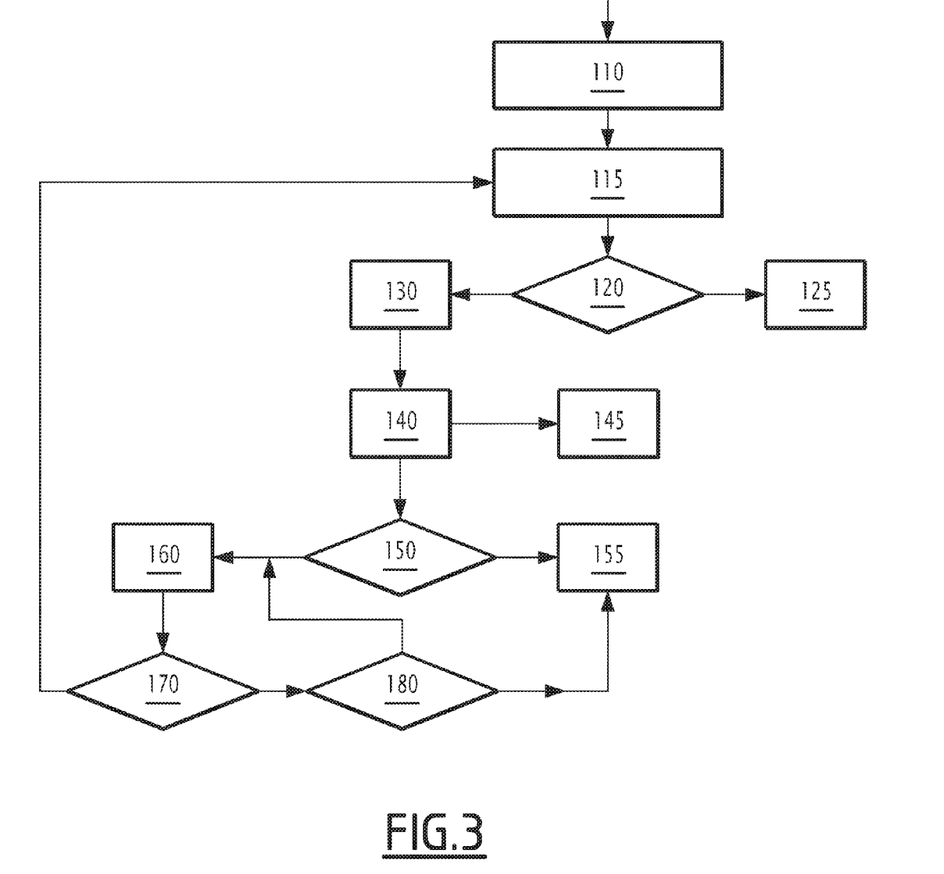
FIG. 3 is a flowchart of a piloting aid method according to the invention, the method being carried out by the device of FIG. 2.

The piloting aid method according to the invention will now be explained in reference to FIG. 3, showing a flowchart of its operations.

Initially, before aircraft 10 departs, a flight plan is determined. This flight plan is therefore initially the current flight plan of the aircraft.

The following operations of the method are carried out during the takeoff, flight or landing of aircraft 10, each time an instruction is received by communication device 15 that is intended to alter the current flight plan of aircraft 10.

Thus, during operation 110, acquisition module 21 acquires such an instruction and the operating data of the set of systems 11 and the current flight plan of aircraft 10.

Then, acquisition module 21 sends this information to processing module 23.

The acquired instruction is for example of the type "reach [level L1] before passing [position P1]", which means that aircraft 10 must reach a level (altitude) L1 before passing position P1. This instruction is illustrated schematically in FIG. 4, in which level L0 corresponds to the current level of aircraft 10.

During the following operation 115, processing module 23 analyzes the compatibility of the instruction with the operational capacities of aircraft 10 and with the constraints of the current flight plan.

In particular, during this operation 115, processing module 23 determines an applicability period of the instruction.

The applicability period of the instruction includes one or several continuous segments, each segment being made up of a plurality of applicability moments of the instruction.

Each applicability moment of the instruction is determined relative to a moment in time of the flight or relative to a waypoint in the current flight plan of aircraft 10. Each applicability moment is thus a moment in time or space.

In such an applicability moment, the acquired instruction is compatible with the operational capabilities of aircraft 10 and with the constraints of the current flight plan.

An instruction is compatible with the operational capabilities of aircraft 10 when the set of systems 11 makes it possible to carry out this instruction in the corresponding applicability moment. To determine this, processing module 23 analyzes the operating data for all of systems 11 and the values of the operational parameters in this applicability moment.

An instruction is compatible with the constraints of the flight plan when the result of its implementation in the corresponding applicability moment is compatible with the constraints of the flight plan.

Figure 4:
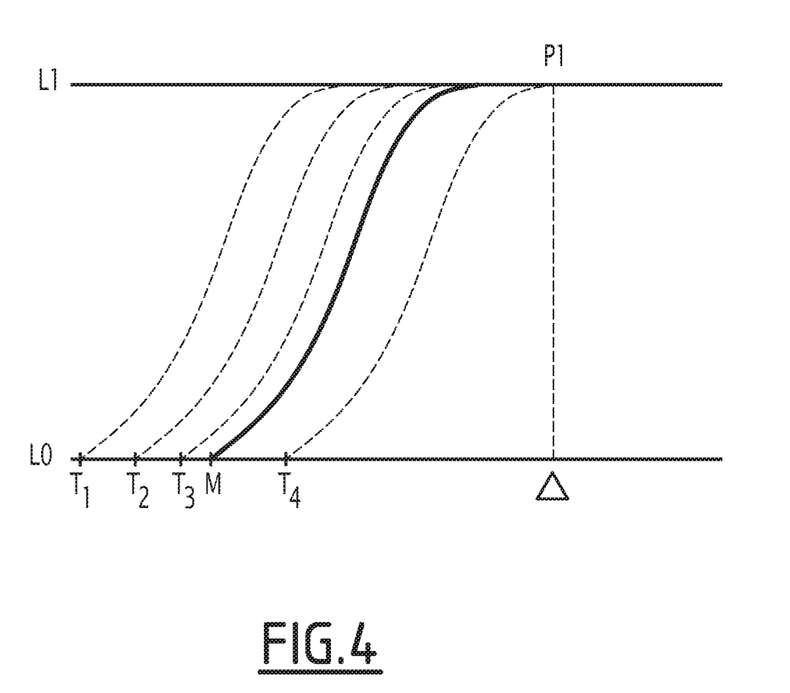
FIG. 4 is a schematic view illustrating the implementation of several operations of the method of FIG. 3.

In the example of FIG. 4, during this operation 115, processing module 23 in particular analyzes the compatibility of the instruction with the ascent capability of aircraft 10. This capability is analyzed in light of the operating data from all of systems 11 as well as the values of the operational parameters at different moments, for example the weight of aircraft 10.

Thus for example, during this operation 115, an applicability period comprising two segments $[T_1, T_2]$ and $[T_3, T_4]$ is determined.

Each of these segments $[T_1, T_2]$ and $[T_3, T_4]$ is made up of a plurality of moments in time of applicability in which the instruction is compatible with the operational capabilities of aircraft 10 and with the constraints of the current flight plan.

During the following operation 120, processing module 23 analyzes the determined applicability period.

When this period does not include any applicability moment, or in other words, when the applicability period is empty, processing module 23 goes to operation 125.

Otherwise, processing module 23 goes to operation 130.

During operation 125, processing module 23 notifies the pilot that the acquired instruction is not compatible with the operational capabilities and/or with the flight plan of aircraft 10.

This notification is given to the pilot via display module 27, optionally indicating one or several incompatibility reasons.

During operation 130, processing module 23 determines, for each applicability moment of the applicability period of the instruction, an altered flight plan in case of application of the instruction in this applicability moment.

Then, for each altered flight plan, processing module 23 determines values of the operational parameters at least at certain scheduled waypoints of the altered flight plan or in positions comprised between these waypoints.

Thus, processing module 23, for example, determines the operational parameter relative to the flight time at the waypoint corresponding to the final destination of aircraft 10.

During the following operation 140, processing module 23 selects an optimal applicability moment from among the set of applicability moments.

This selection is made in particular based on values of the operational parameters determined during operation 130 and based on optimization criteria from database 25.

In particular, during this operation 140, for each applicability moment, processing module 23 calculates deviations between the values of the operational parameters determined for the altered flight plan corresponding to this applicability moment and the corresponding values associated with the current flight plan.

Processing module 23 further verifies the rules or optimization preferences imposed by the optimization criteria of the database 25.

Additionally, processing module 23 calls on optimization functions of another system of aircraft 10, for example, the FMS.

Thus, in the example of FIG. 4, the applicability moment M of the segment $[T_3, T_4]$ is selected as optimal. This moment for example makes it possible to ensure the optimal arrival time according to economic criteria of the airline operating aircraft 10.

Then, during the following operation 145, processing module 23 notifies the pilot of the optimization results for the applicability moments by displaying, on the corresponding screen, for example, the deviations calculated during operation 140 and corresponding to the optimal applicability moment.

During the same operation, the pilot has the option of accepting or rejecting the application of the instruction at the optimal applicability moment. When the application of the instruction is accepted by the pilot, the current flight plan is replaced by the altered flight plan corresponding to the optimal applicability moment of the instruction.

Alternatively, the instruction is applied without explicit acceptance by the pilot. In this case, the current flight plan is replaced automatically by the altered flight plan corresponding to the optimal applicability moment of the instruction.

During operation 150, processing module 23 determines whether the instruction is applicable immediately.

When the instruction is to be implemented immediately, i.e., when the optimal applicability moment of this instruction is imminent, processing module 23 goes to operation 155.

Otherwise, i.e., when the implementation of the instruction is deferred, processing module 23 goes to operation 160.

During operation 155, processing module 23 develops a piloting command making it possible to implement the instruction.

Then, processing module 23 displays this piloting command to the pilot, who has the possibility of commanding, or not commanding, the implementation of this command.

During operation 160, processing module 23 displays, via display module 27, an icon- and/or text-based depiction of the instruction.

This depiction is for example displayed on side and vertical navigation screens and on a time scale.

The image on the time scale advantageously includes the applicability period of the instruction and the optimal applicability moment.

This icon-based depiction is associated with the elements making up the current flight plan, which is dynamically refreshed.

Furthermore, this icon-based depiction can vary based on the content of the instruction.

Thus, for example, when the instruction relates to an altitude change of aircraft 10, the icon-based depiction for example includes a symbol displaying the ascent and descent of the aircraft.

During the following operation 170, processing module 23 monitors any alteration of the flight plan as well as operating data and operational parameters, and in case of alteration, returns to operation 115 previously described.

In particular, during this performance of operation 115, the compatibility with the operational capabilities and with the constraints of the flight plan of the same instruction is determined again.

Otherwise, processing module 23 goes to operation 180.

During this operation 180, processing module 23 verifies the deadline of the optimal applicability moment.

When this applicability moment has arrived, processing module 23 goes to operation 155, previously explained, to develop a piloting command making it possible to carry out the instruction.

Otherwise, the processing module goes to operation 160 again.

One can then see that the invention has a certain number of advantages.

In particular, the piloting aid method according to the invention makes it possible to ensure intuitive, fast, fluid processing in continuity with the unfolding of the flight of each instruction intended to alter the current flight plan.

This processing only requires the pilot's intervention for the final operation in order to confirm or reject the implementation of the instruction.

This method accounts for the constraints of the flight plan and the operational capabilities of the aircraft to determine applicability moments of the instruction.

According to one particularly advantageous aspect of the invention, the method further makes it possible to determine an optimal applicability moment, for example by taking into account optimization criteria imposed by the corresponding airline.

All of these actions are done with no intervention by the pilot, which simplifies the piloting of the aircraft and decreases error risks.

Lastly, the method according to the invention proposes an intuitive depiction of the instruction with deferred implementation, which makes it possible for the pilot to identify it and understand its meaning particularly intuitively.

The invention claimed is:

1. An aid method for piloting an aircraft, the aircraft comprising a set of systems implementing operational capabilities of the aircraft, the aircraft performing a flight according to a flight plan, the flight plan including a plurality of waypoints of the aircraft and a plurality of constraints at least at some of these waypoints, the flight plan being associated with operational parameters relative to the flight and/or the aircraft and assuming different values at various waypoints of the flight plan, the method comprising:
  acquiring an instruction from a system outside the aircraft to alter a current flight plan of the aircraft;
  determining an applicability period of the instruction comprising a plurality of applicability moments at which performance of the instruction is compatible with the operational capabilities of the aircraft and with the constraints of the current flight plan of the aircraft, each applicability moment being defined relative to a moment in time of the flight or relative to a geographical position of the aircraft;
  for each applicability moment, determining an altered flight plan if the instruction were to be performed at the applicability moment, and calculating values of the operational parameters associated with the altered flight plan; and
  selecting an optimal applicability moment from among the plurality of applicability moments based on values of the operational parameters associated with the altered flight plan corresponding to each applicability moment and values of the operational parameters associated with the current flight plan, comprising verifying a plurality of optimization criteria.

2. The method according to claim 1, further comprising replacing the current flight plan with the altered flight plan corresponding to the optimal applicability moment of the instruction.

3. The method according to claim 1, further comprising notifying a pilot of the applicability period of the instruction and the optimal applicability moment.

4. The method according to claim 1, further comprising a piloting command applying the instruction at the optimal applicability moment.

5. The method according to claim 1, further comprising notifying a pilot of incompatibility when there is no applicability moment at which performance of the instruction is compatible with the operational capabilities of the aircraft and with the constraints of the current flight plan of the aircraft.

6. The method according to claim 1, wherein one or more of the operational parameters correspond to an element chosen from the group consisting of: remaining flight time, quantity of fuel available in the aircraft, altitude of the aircraft, speed of the aircraft, and weight of the aircraft.

7. The method according to claim 1, wherein said selecting an optimal applicability moment comprises calculating deviations between values of the operational parameters associated with each altered flight plan and values of the operational parameters associated with the current flight plan.

8. The method according to claim 7, further comprising generating an optimization report, the optimization report comprising deviations between values of the operational parameters associated with the altered flight plan corresponding to the optimal applicability moment and values of the operational parameters associated with the current flight plan.

9. The method according to claim 1, wherein the optimization criteria are accessed from a database, the optimization criteria being determined by an airline operating the aircraft.

10. The method according to claim 1, wherein, in case of alteration of the current flight plan or operational parameters associated with the current flight plan for reasons other than performance of the instruction, said determining an applicability period, said determining an altered flight plan, and said selecting an optimal applicability moment are carried out again.

11. A non-transitory computer readable medium storing instructions which, when executed by a processor of a computer, cause the computer to implement the method of claim 1.

12. An aid device for piloting an aircraft, the aircraft including a set of systems implementing operational capabilities of the aircraft, the aircraft performing a flight according to a flight plan, the flight plan including a plurality of waypoints of the aircraft and a plurality of constraints at least at some of these waypoints, the flight plan being associated with operational parameters relative to the flight and/or the aircraft and assuming different values at various waypoints of the flight plan, wherein the device is configured to:
  acquire an instruction from a system outside the aircraft to alter a current flight plan of the aircraft;
  determine an applicability period of the instruction comprising a plurality of applicability moments at which performance of the instruction is compatible with the operational capabilities of the aircraft and with the constraints of the current flight plan of the aircraft, each applicability moment being defined relative to a moment in time of the flight or relative to a geographical position of the aircraft;
  for each applicability moment, determine an altered flight plan if the instruction were to be performed at the applicability moment, and calculate values of the operational parameters associated with the altered flight plan; and select an optimal applicability moment from among the plurality of applicability moments based on values of the operational parameters associated with the altered flight plan corresponding to each applicability moment and values of the operational parameters associated with the current flight plan, by verifying a plurality of optimization criteria.

* * * * *